Oct. 20, 1953   C. K. STILLWAGON   2,656,229
PISTON AND PISTON AND ROD COMBINATION
Filed April 9, 1951                        2 Sheets-Sheet 1

CRAWFORD K. STILLWAGON
INVENTOR.

BY Browning & Simms
ATTORNEYS

CRAWFORD K. STILLWAGON
INVENTOR.

Patented Oct. 20, 1953

2,656,229

UNITED STATES PATENT OFFICE 2,656,229

PISTON AND PISTON AND ROD COMBINATION

Crawford K. Stillwagon, Houston, Tex.

Application April 9, 1951, Serial No. 219,966

13 Claims. (Cl. 309—17)

1

This invention relates to improvements in piston and piston rod assemblies and refers more particularly to high pressure piston and piston rod assemblies wherein the piston is removably secured to the piston rod and includes a rigid body which carries resilient seal elements adapted to seal against a pump cylinder wall.

Pumps of this character are frequently used in oil field operations for the circulation of drilling mud and also in cementing operations in the completion of oil and gas wells. In service, quite high pressures are developed and a great deal of difficulty is experienced in sealing the piston body on the piston rod because due to the abrasive character of the fluids pumped a slight leakage between the piston body and the piston rod will result in a rapid cutting away of the material either of the piston or the rod or both. It has heretofore been recommended to use a resilient seal element between the abutting seal surfaces of the rod and rigid piston body, but this cuts down the amount of metal-to-metal contact and frequently results in distortion of the metal-to-metal contact parts upon assembly of the piston upon a rod because the usual nut for securing the piston on the rod is screwed very tightly against the piston, placing it under great pressure and where the area of the metal-to-metal contact is reduced due to the use of a resilient seal element such as an O-ring, there is not sufficient strength in the materials to withstand the extreme pressures encountered when the nut is tightly screwed upon the rod. Of course, any distortion of the seat surfaces makes it more likely for a cutting action to take place, and also frequently will cause the piston to become locked upon the rod so as to be very difficult, if not impossible, to remove.

Also, in pistons of this type considerable difficulty is encountered in the chewing off of the resilient seal elements adjacent the usual outturned metallic flange which backs up the element. Of course, the flange is sufficiently small in outer diameter so as to provide a positive clearance with the cylinder wall in which the piston is to operate. This leaves a space which permits cold flow of the material of the seal elements, under the extreme pressures developed in the pump, which extrudes between the very small clearance between the flange and the cylinder wall. Movement of the piston then chews this extruded resilient seal material off of the main body and results in premature destruction of the piston.

2

An object of this invention is to provide a rugged piston and piston rod combination having a large area of metal-to-metal contact between the body and the rod parts which limit longitudinal movement of the piston on the rod when assembled and which still provides a seal of resilient sealing material between the body part and the rod.

Another object is to provide a piston and a piston and rod combination wherein a resilient seal material provides a seal between the rod and rigid body part upon assembly and in which the body part may then be tightly secured in place and a small recess is provided to receive the compressed portion of the resilient seal element as this last operation is accomplished so as to prevent flow of the seal element under compression between the abutment surfaces of the piston body and the abutment member or nut on the piston rod.

A further object is to provide a piston and a piston and rod combination wherein a large abutment surface between rigid parts is provided to withstand the load under which the piston is placed on assembly of the piston upon the rod and which provides a lip type seal of resilient sealing material to seal between the rod abutment member and the piston body part.

Still another object is to provide a piston of the character described having an annular packing member formed of hydraulic packing material which retains the usual resilient seal material of the seal elements against cold flow during pumping operations.

A still further object is to provide a piston of the character described having a packing member fabricated of hydraulic packing material for backing up the resilient material of the seal element wherein a flexible annular flange of the back up material provides a bridging member to bridge the clearance between the piston rigid flange and the wall of a pump cylinder in operation, thereby greatly reducing the likelihood of damage to the piston seal element due to cold flow.

Other and further objects of this invention will appear as the description proceeds.

In the accompanying drawings which form a part of the instant specification and wherein like parts are referred to by like reference numerals in the various views.

Figures 1, 2:
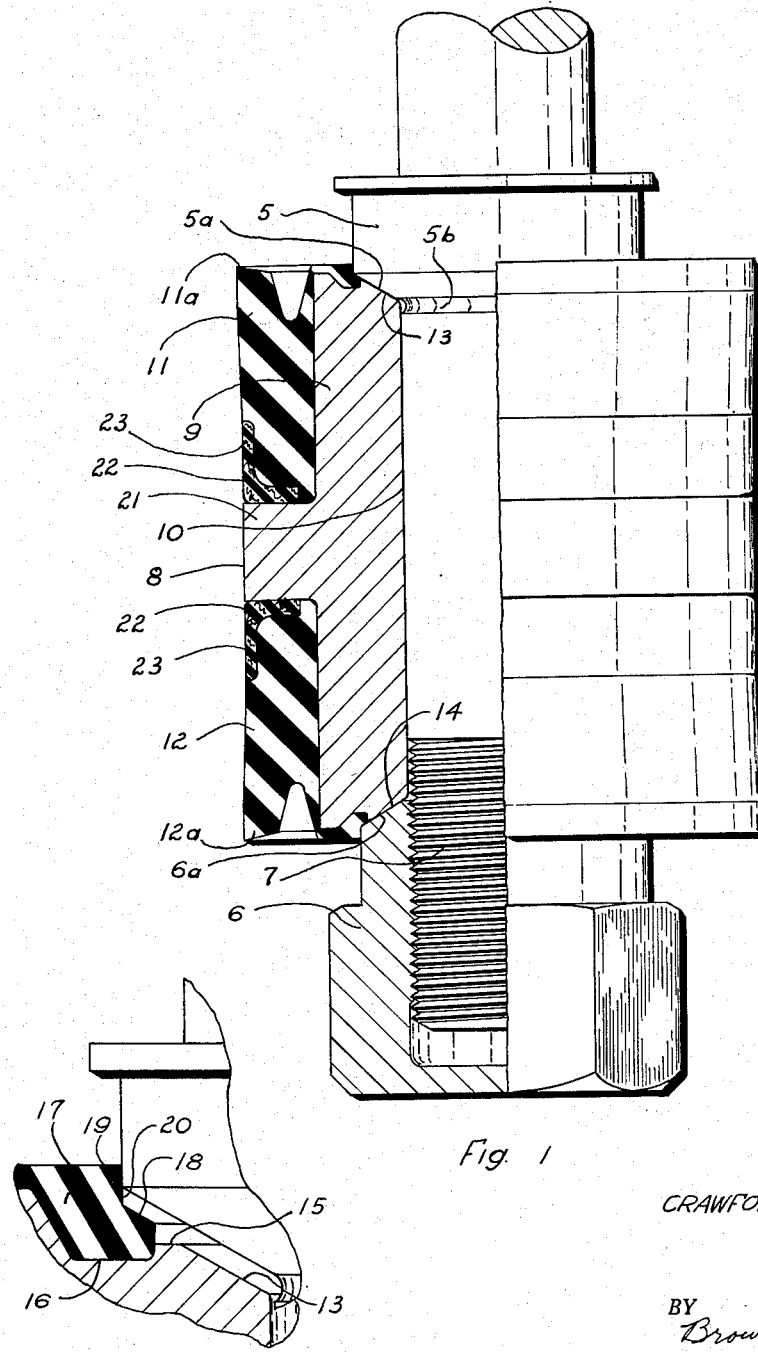
Fig. 1 is an elevational view partially in section illustrating a preferred embodiment of this invention.
Fig. 2 is a detailed view upon an enlarged scale illustrating the seal assembly between the piston rod and the piston in accordance with this invention.

Referring in detail to the drawings and more particularly to Figs. 1 and 2, the piston rod illustrated is of the usual universal type and carries an abutment member 5 and a removable abutment member or nut 6. The nut 6 is threaded on the threaded end 7 of the rod and the nut and member 5 are adapted to secure the piston shown generally at 8 upon the end of the rod.

Both of the abutment members 5 and 6 have outwardly protruding tapered or frusto-conical abutment and seal surfaces 5a and 6a, respectively. These surfaces are of rather large bearing area whereby in making up the piston upon the rod the nut 6 may be turned tightly so as to positively secure the piston 8 upon the rod end.

The piston 8 is made up of a rigid body part 9 having a passage 10 therethrough to receive the end of the rod. While body part 9 is shown as a single integral rigid part, it is contemplated that the body part may be made up in more than one part as, for example, in my co-pending application, Serial Number 177,724, filed August 4, 1950, for United States Letters Patent. Attention is particularly called to Fig. 5 of that co-pending application. The piston 8 has secured to the body part, preferably by bonding, two resilient seal elements 11 and 12 which are shown of the lip type, the outer lips 11a and 12a, respectively, of these elements being adapted to seal against the wall of a pump cylinder.

In order to provide a maximum bearing surface between the rigid body part and the abutment members carried by the piston rod and still provide a positive seal between the body and the rod abutment members, a novel seal and abutment arrangement has been provided. The piston body is provided with a seal and abutment surface at each end 13 and 14, respectively. The seal surfaces and arrangement at both ends of the body are the same and in the interest of simplicity, the description will be directed to the abutment and seal between the body and the member 5, because this is detailed on an enlarged scale in Fig. 2.

The abutment and seal surface 13 is preferably tapered or frusto-conically shaped so as to provide a recess at the end of the rigid body. The body is provided with a surface 15 concentric with and immediately adjacent the surface 13, the surface 15 being formed on a plane substantially normal to the axis of the opening 10 through the rigid body. The end of the body is provided with a concentric groove 16 immediately adjacent the surface 15, this groove being provided by concentric surfaces formed on the rigid body. Within this groove 16 is embedded and secured a resilient seal element having a portion 17 arranged to provide a seal between the body and the abutment member 5. Preferably, this seal element is an integral part of the main seal element 11, as is illustrated in the drawings. The seal element preferably is bonded to the rigid body and is formed with an annular surface 18 which is off-set from the body slightly more than is the surface 13 so as to be raised relative thereto. Because of this off-set of the surface 18, which preferably is formed along a taper similar to that of surface 13, it is first engaged by the abutment surface 5a upon assembly of the piston upon the rod before the surface 5a engages the surface 13. Then, as the nut 6 is tightened to bring the abutment surface 13 into engagement with surface 5a, the resilient seal element will be placed under compression and the surface 15, being formed on an angle relative to the surface 13, provides an annular groove in which the material of the seal element 17 may flow under compression thereby insuring against the material of element 17 being forced between the surfaces 5a and 13. This is desirable in order to reduce the likelihood of the material being forced between those surfaces which would prevent their actual seating to provide the best abutment.

With this arrangement, the surface 18 need not be more than a narrow surface and does not materially reduce the dimension of the surface 13. Therefore, the surface 13 can be of considerably larger area than is the case where an O-ring or similar resilient seal element is embedded in a groove formed in the abutment surface of the piston body.

In order to even more positively seal between the body and abutment member 5, the resilient element 17 is provided with a lip 19 adapted to seal against the cylindrical peripheral surface of member 5 under the influence of the pressure sealed against. This lip 19 is provided by the cylindrical surface 20 formed on the resilient element immediately above the surface 18. This cylindrical surface need be of only slight height and as the member 5 is brought into seating engagement with the surface 13, the seal element 17 is placed under some compression due to the raised character of the surface 18 relative to the surface 13. This causes a snug fit of the surface 20 against the periphery of the member 5 providing an initial seal and then the pressure sealed against will force the material even tighter against the abutment 5 in operation.

It will be seen that there has been provided a piston and a piston and rod combination wherein the joint between the abutment member 5 and the piston body is positively and adequately sealed even better than has heretofore ever been possible. Also, this has been accomplished without sacrifice to any appreciable degree of the area of the abutment between the rigid body and the abutment member 5. Therefore, the nut 6 may be tightly screwed upon the rod using long wrenches and the strong backs of the usual roughnecks in oil field work and the like without likelihood of any distortion of the abutment surface of the piston or of the abutment member 5 carried by the rod. It has been found in actual practice that where this abutment surface 13 is not of full size and the nut 6 is tightly screwed upon the rod, sometimes a distortion of the abutment surface 13 causes a portion thereof to flow into the groove 5b which is usually provided at the base of the surface 5a so as to permit completion of the machining of the surface 5a. Where this occurs, it is very difficult and sometimes impossible to remove the piston 8 from the rod without destroying the rod itself.

Another difficulty encountered in pistons of this general type has been to provide against cold flow of the resilient element 11 past the annular flange 21 which is provided on the body to back up the resilient seal element. Of necessity, the outer diameter of this flange 21 cannot be quite as great as the inner diameter of the pump cylinder, and this provides a slight clearance into which the material of the resilient seal element 11 tends to be forced by the pressure sealed against. Reciprocation of the piston within the pump cylinder causes this material to be chewed off in the event it actually flows into this clearance, and this is one common cause of failure of pistons in actual service. In accordance with this invention, a means is provided to substantially eliminate the likelihood of damage to a piston element due to cold flow and this has been found to be possible by using a back up member 22 formed of hydraulic packing material which is a duck-like material impregnated with rubber, synthetic rubber or the like. This back up material is placed between the resilient material and the flange at its outer extremity. Preferably, the back up member 22 has an up-turned annular flange 23 which retains the resilient seal material of element 11. This flange 23 has sufficient flexibility so that it can, under sufficient pressure, expand at least substantially into contact with the cylinder wall and provides a tapering means to fill up the annular gap provided by the clearance between the outer periphery of rigid flange 21 and the inner wall of the pump cylinder. This has been found in actual practice to substantially eliminate any tendency of cold flow of the resilient seal elements and resultant damage thereto. Comparative tests have been made between this type of back up member 23 and back up members fabricated of nylon, wire mesh and other materials, and it has been unexpectedly found that the hydraulic packing material gives results far superior to any other materials tested and is the only material tested that actually substantially eliminates damage to the resilient elements due to cold flow.

Figure 3:
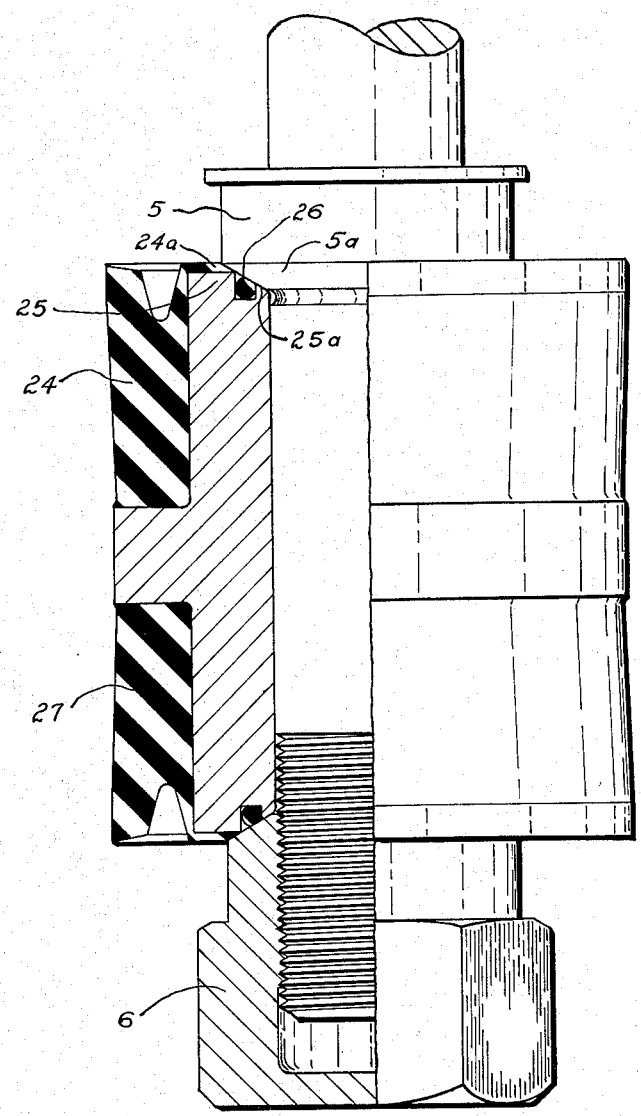
Fig. 3 is a view showing another modification of the invention, the modified piston and rod assembly being shown in elevation and partially in section.

A modified form of the invention is shown in Fig. 3 wherein the lip type seal arrangement between the member 5 and the resilient seal element 24 has been eliminated. In this arrangement, the portion 24a of the resilient seal element provides a seal between the body part 25 and the abutment surface 5a of abutment member 5. The portion of the seal element 24a which engages the abutment surface 5a preferably is tapered similarly to the taper on the portion 25a which is the abutment surface of the rigid piston member. Again, this surface on the resilient element 24a is off-set slightly from the end of the body so as to be raised relative to the surface 25a were it extended radially outwardly. This provides initial compression of the resilient seal material before abutment of the rigid abutment surfaces 5a and 25a is accomplished. It is believed readily apparent that the pressure sealed against by the portion of the material 24a which will reside between the surface 5a and the end of body 5, when the piston is assembled upon a rod and in operation, will force the material more tightly into this tapered groove so as to perfect a seal. However, it is sometimes desirable to employ an auxiliary seal in the form of an O-ring 26 which may be embedded in a groove formed in the end of the piston body part 25. However, this O-ring should not be employed where the nut 6 is to be tightly screwed upon the end of the piston rod so as to apply sufficient force thereto as to be likely to distort the material of the rigid body at or adjacent the portion or surface 25a thereof.

In this modification, the seal and abutment arrangement at the end of the rigid body which confronts the nut 6 may be identical to that described and in the interest of simplicity, this will not be repeated, but it is to be understood that the two ends of the rigid body part and the resilient seal elements 24 and 27 are similarly formed.

From the foregoing it will be seen that this invention is one well adapted to attain all of the ends and objects hereinabove set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A high pressure pump piston comprising a rigid body with an opening therethrough adapted to be received upon and secured to a piston rod, said body having at one end a rigid annular frusto-conically shaped seal and abutment surface, a resilient seal element bonded on the body externally thereof and having at least a portion extending concentrically about the abutment surface, the exposed surface of the seal element adjacent the edge of the abutment surface being shaped similar to the abutment surface but spaced somewhat endwise from the body relative to the general contour of the abutment surface were it extended outwardly so as to be raised relative thereto, the innermost diameter of said portion being spaced outwardly a short distance from the outer diameter of the abutment surface.

2. The pump piston of claim 1 wherein the seal element has a portion with an outer peripheral seal surface providing the main peripheral seal member for the piston, wherein the end of said resilient seal element is provided with a V-shaped annular groove between the portion providing the peripheral seal and the portion concentric with the abutment surface.

3. In a high pressure pump piston a rigid body with an opening therethrough, one end of the body being formed with a plurality of differently formed concentric annular surfaces, the innermost of these concentric surfaces being tapered inwardly to provide a seal and abutment surface, a narrow surface formed substantially in a plane normal to the axis of the opening, said narrow second surface lying immediately adjacent and surrounding the tapered surface and joining thereto, the next outer surfaces providing an annular groove immediately surrounding the second surface, a resilient seal element bonded to the body having a portion filling the groove, this latter portion having an annular tapered surface immediately adjacent the second surface, the taper of said latter tapered surface corresponding to the taper of the abutment surface, but being off-set slightly from the conical plane thereof whereby it is raised relative thereto, said latter portion of the resilient element having a substantially cylindrical surface of slight height immediately adjacent and extending outwardly of the tapered surface thereof.

4. In combination a piston rod and piston, the piston having a rigid body with a passage therethrough to receive the rod, means for positioning and securing the piston upon the rod including a threaded end on the rod and a nut, said nut having an annular outwardly protruding tapered abutment and seal surface at one end, a correspondingly tapered abutment and seal surface on the adjacent end of the rigid body part, the latter surface having a somewhat smaller outer diameter than that of the abutment surface of the nut, a second surface on said body disposed outwardly of the abutment surface on said body and opposing said abutment surface on said nut, said second surface and said abutment surface on said nut diverging outwardly from each other, and a resilient seal element carried by the body having a portion with an annular surface concentric with the abutment surface on the body and of greater diameter, raised somewhat relative to the plane of said abutment surface of the body were it extended when the piston is separate from the rod and engaged and compressed by the outer portion of the nut abutment surface when the piston is assembled on the rod.

5. In combination a piston rod and a piston, the piston having a rigid body with a passage therethrough to receive the rod, means for positioning and securing the piston upon the rod including a threaded end on the rod and a closed end nut, said nut having an annular outwardly protruding tapered abutment and seal surface at one end and a cylindrical outer surface adjoining said tapered surface, a correspondingly tapered abutment and seal surface on the adjacent end of the rigid body part, the latter surface having a somewhat smaller outer diameter than that of the abutment surface of the nut, and a resilient seal element carried by the body having a portion with an annular surface concentric with the abutment surface on the body and of a greater diameter, raised somewhat relative to the plane of said abutment surface of the body were it extended when the piston is separate from the rod and engaged and compressed by the outer portion of the nut abutment surface when the piston is assembled on the rod, said portion having an inner cylindrical surface engaging the cylindrical surface of said nut to provide a lip type seal with the outer periphery of the nut upon assembly of the piston upon the rod.

6. The piston and rod combination of claim 5 wherein the resilient seal element on the piston body also has a portion adapted to provide the outer peripheral seal of the piston to engage a pump cylinder upon operation thereof in a pump cylinder, wherein the end of said resilient seal element is provided with a V-shaped annular groove between the portion providing the peripheral seal and the portion concentric with the abutment surface.

7. In combination a piston rod and a piston, the piston having a rigid body with a passage therethrough to receive the rod, means for positioning and securing the piston upon the rod including a member on the rod for limiting movement of the piston along the rod in one direction, said member having an annular outwardly protruding tapered abutment and seal surface confronting the body, a corresponding tapered abutment and seal surfacge on the adjacent end of the rigid body part, the latter surface having a somewhat smaller outer diameter than that of the abutment surface of the member, a second surface on said body disposed outwardly of the abutment surface on said body and opposing said abutment surface on said member, said second surface and said abutment surface on said member diverging outwardly from each other, and a resilient seal element carried by the body having a portion with an annular surface concentric with the abutment surface on the body and of greater diameter and raised somewhat relative to the plane of said abutment surface of the body were it extended when the piston is separate from the rod and engaged and compressed by the outer portion of the abutment surface on the member when the piston is assembled on the rod.

8. The combination of claim 7 wherein the rigid body member is formed so as to provide a slight recess between it and the resilient seal element so as to accommodate the initial compression of the resilient seal element when the combination is assembled.

9. The combination of claim 7 wherein the rigid body member is formed so as to provide a slight recess between it and the resilient seal element so as to accommodate the initial compression of the resilient seal element when the combination is assembled, the resilient seal element having a lip type sealing means engaging the outer periphery of the nut upon assembly of the piston upon the rod.

10. In combination a piston rod and a piston, the piston having a rigid body with a passage therethrough to receive the rod, means for positioning and securing the piston upon the rod including a member on the rod for limiting movement of the piston along the rod in one direction, said member having an annular outwardly protruding tapered abutment and seal surface confronting the body, a correspondingly tapered abutment and seal surface on the adjacent end of the rigid body part, the latter surface having a somewhat smaller outer diameter than that of the abutment surface of the member, a narrow surface formed substantially in a plane normal to the axis of said rod, said narrow surface being concentric with and adjoining the abutment surface, an annular groove adjoining said narrow surface, and a resilient seal element carried by the body having a portion filling said groove with an annular surface concentric with the abutment surface on the body and of greater diameter than said narrow surface and raised somewhat relative to the plane of said abutment surface of the body were it extended when the piston is separate from the rod and engaged and compressed by the outer portion of the abutment surface on the member when the piston is assembled on the rod, the resilient seal element having a lip type sealing means engaging the outer periphery of the nut upon assembly of the piston upon the rod.

11. The combination of claim 10 wherein two such members are provided upon the rod, one of which is integral therewith and the other of which is a nut threaded upon the rod, the body having similar abutment and seal surfaces and resilient elements at each end to cooperate with the two members on the rod.

12. A piston comprising a rigid body part with an opening therethrough and an outwardly extending rigid flange with a radially extending flat surface, a resilient seal element on the body part arranged to be backed up by the flange and an annular back-up packing member fabricated of hydraulic packing material arranged between the outer edge of the flange and the resilient seal element, said back-up packing having a flat annular portion disposed upon the flat surface of the flange and an annular substantially cylindrical portion extending perpendicularly from the flat annular portion and providing a portion of the exterior of the periphery of the piston adjacent the flange, whereby to reduce damage to the resilient seal element due to cold flow during operation.

13. A high pressure pump piston comprising a rigid body with an opening therethrough adapted to be received upon and secured to a piston rod, said body having at one end a rigid annular abutment surface, a second annular surface extending outwardly from and joining the first surface and inclined relative to the abutment surface toward the outer periphery of the body, a resilient seal element bonded on the body externally thereof, said seal element having at least a portion extending annularly about the abutment surface and spaced outwardly therefrom, an exposed surface on the seal element lying in a plane substantially parallel to the plane of the abutment surface and separated from the abutment surface by the second surface, said exposed surface being spaced somewhat endwise from the body relative to the plane of the abutment surface were it extended radially outwardly so as to be raised relative thereto, the second annular surface due to its inclination providing an annular groove between the abutment surface and the exposed surface of the seal element.

CRAWFORD K. STILLWAGON.

References Cited in the file of this patent

UNITED STATES PATENTS

| Number | Name | Date |
|---|---|---|
| 2,216,577 | Stillwagon | Oct. 1, 1940 |
| 2,277,501 | Murray | Mar. 24, 1942 |
| 2,306,800 | Caldwell | Dec. 29, 1942 |
| 2,487,390 | Smith | Nov. 8, 1949 |
| 2,528,104 | Young | Oct. 31, 1950 |